United States Patent
Kim et al.

(10) Patent No.: US 8,170,574 B2
(45) Date of Patent: May 1, 2012

(54) METHOD AND APPARATUS FOR CONTROLLING INTERFERENCE BETWEEN CELLS IN MOBILE COMMUNICATION NETWORK

(75) Inventors: Hyung-sub Kim, Daejeon-si (KR); Yeon-seung Shin, Daejeon-si (KR); Sang-woo Nam, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 403 days.

(21) Appl. No.: 12/559,224

(22) Filed: Sep. 14, 2009

(65) Prior Publication Data

US 2010/0151875 A1    Jun. 17, 2010

(30) Foreign Application Priority Data

Dec. 16, 2008  (KR) .................. 10-2008-0127959

(51) Int. Cl.
*H04W 72/00*    (2009.01)
(52) U.S. Cl. ............... 455/452.2; 455/63.1; 455/114.2; 370/328; 370/230; 370/235
(58) Field of Classification Search ............... 455/63.1, 455/114.2–115.4, 127.1, 450–453
See application file for complete search history.

(56) References Cited

U.S. PATENT DOCUMENTS

| 7,042,856 B2 | 5/2006 | Walton et al. |
| 2006/0205412 A1* | 9/2006 | Oh et al. ............... 455/450 |

FOREIGN PATENT DOCUMENTS

| KR | 1020040055735 | 6/2004 |
| KR | 1020080018675 | 2/2008 |
| KR | 1020090062055 | 6/2009 |

OTHER PUBLICATIONS

Ei-Dolil, S.A.; Al-nahari, A.Y.; Desouky, M.I.; El-samie, F.A.; , "Uplink multi-cell admission control for WCDMA networks with heterogeneous traffic," Radio Science Conference, 2008. NRSC 2008. National , vol., No., pp. 1-11, Mar. 18-20, 2008.*

* cited by examiner

*Primary Examiner* — Ajit Patel
*Assistant Examiner* — Erica Navar
(74) *Attorney, Agent, or Firm* — Nelson Mullins Riley & Scarborough LLP; EuiHoon Lee, Esq.

(57) ABSTRACT

A method and apparatus for controlling interference between cells for non-real time data transfer in a mobile communication network is provided. The method of controlling interference between cells in a mobile communication system including a plurality of cells includes: dividing each cell into at least one segment based on density of terminals within each cell and distance from the center of each cell; allocating rise over thermal (RoT) with respect to each segment based on the distance from the center of each cell, an attenuation ratio according to the distance, and a shadowing factor; and providing data services to terminals within each segment according to the allocated RoT. Accordingly, it is possible to improve system throughput.

16 Claims, 4 Drawing Sheets

METHOD AND APPARATUS FOR CONTROLLING INTERFERENCE BETWEEN CELLS IN MOBILE COMMUNICATION NETWORK

CROSS-REFERENCE TO RELATED APPLICATION

This application claims the benefit under 35 U.S.C. §119(a) of Korean Patent Application No. 10-2008-127959, filed on Dec. 16, 2008, the disclosure of which is incorporated by reference in its entirety for all purposes.

BACKGROUND

1. Field

The following description relates to a wireless resource management in a mobile communication network and, more particularly, to a method and apparatus for controlling interference between cells for non-real time data transfer in a mobile communication network.

2. Description of the Related Art

A variety of techniques for preventing interference between cells in a mobile communication network have been researched. In particular, there are several techniques for preventing interference between cells in downlink services. For example, frequencies are divided and reused or time is divided to allocate different service priorities to prevent interference between cells in downlink services.

There is a frequency division method by which different frequencies are allocated to the center of a cell and the edge of the cell to reduce interference between cells. The same frequency may be allocated to the center of each cell since the centers of cells are distant from each other so that the frequency interference is insignificant and a link is in a good condition. However, since edges of each cell are adjacent to each other cell so that the frequency interference occurs, the same frequency may not be allocated to the edges of each cell. Accordingly, frequencies are divided and allocated such that the same frequency is used at the center of each cell and different frequencies are used at the edges of each cell.

Accordingly, interference between cells can be reduced by allocating different frequencies to a cell according to the distance from the center of the cell, and an efficient use of frequencies can be made by using the same frequency at the center of each cell.

According to a time division method, different frequency bandwidths are allocated to each service class and the same service is not simultaneously provided to cells using the same frequency. However, although this may be useful in using a limited frequency resource, this is not efficient when the number of users or users requesting specific services significantly increases.

To prevent interference between cells, power control may be used instead of managing the frequency use. A typical power control is used for scheduling considering mutual interference between users in the same cell. According to a broader power control, interference between cells is prevented by calculating optimal power considering how target users for power control would have an effect on other cells.

SUMMARY

The following description relates to a method and apparatus for controlling interference between cells in a mobile communication network.

In one general aspect, a method of controlling interference between cells in a mobile communication system including a plurality of cells includes: dividing each cell into at least one segment based on density of terminals within each cell and distance from the center of each cell; allocating rise over thermal (RoT) with respect to each segment based on the distance from the center of each cell, an attenuation ratio according to the distance, and a shadowing factor; and providing data services to terminals within each segment according to the allocated RoT.

The shadowing factor may indicate an average shadowing level, and the RoT may be inversely proportional to the shadowing factor.

The method may further include, after allocating, determining a frequency bandwidth to be allocated to each segment.

The frequency bandwidth may decrease as a segment becomes distant from the center of the cell.

The frequency bandwidth may be inversely proportional to the shadowing factor.

In another general aspect, an apparatus for controlling interference between cells in a mobile communication system including a plurality of cells includes: a segment dividing part to divide each cell into at least one segment based on density of terminals within each cell and distance from the center of each cell; and a service part to allocate rise over thermal (RoT) with respect to each segment based on the distance from the center of each cell, an attenuation ratio according to the distance, and a shadowing factor and to provide data services to terminals within each segment according to the allocated RoT.

However, other features and aspects will be apparent from the following description, the drawings, and the claims.

BRIEF DESCRIPTION OF THE DRAWINGS

Throughout the drawings and the detailed description, unless otherwise described, the same drawing reference numbers refer to the same elements, features, and structures. The relative size and depiction of these elements may be exaggerated for clarity, illustration, and convenience.

DETAILED DESCRIPTION

The detailed description is provided to assist the reader in gaining a comprehensive understanding of the methods, apparatuses and/or systems described herein. Accordingly, various changes, modifications, and equivalents of the systems, apparatuses, and/or methods described herein will be suggested to those of ordinary skill in the art. Also, descriptions of well-known functions and constructions are omitted to increase clarity and conciseness.

Figure 1:
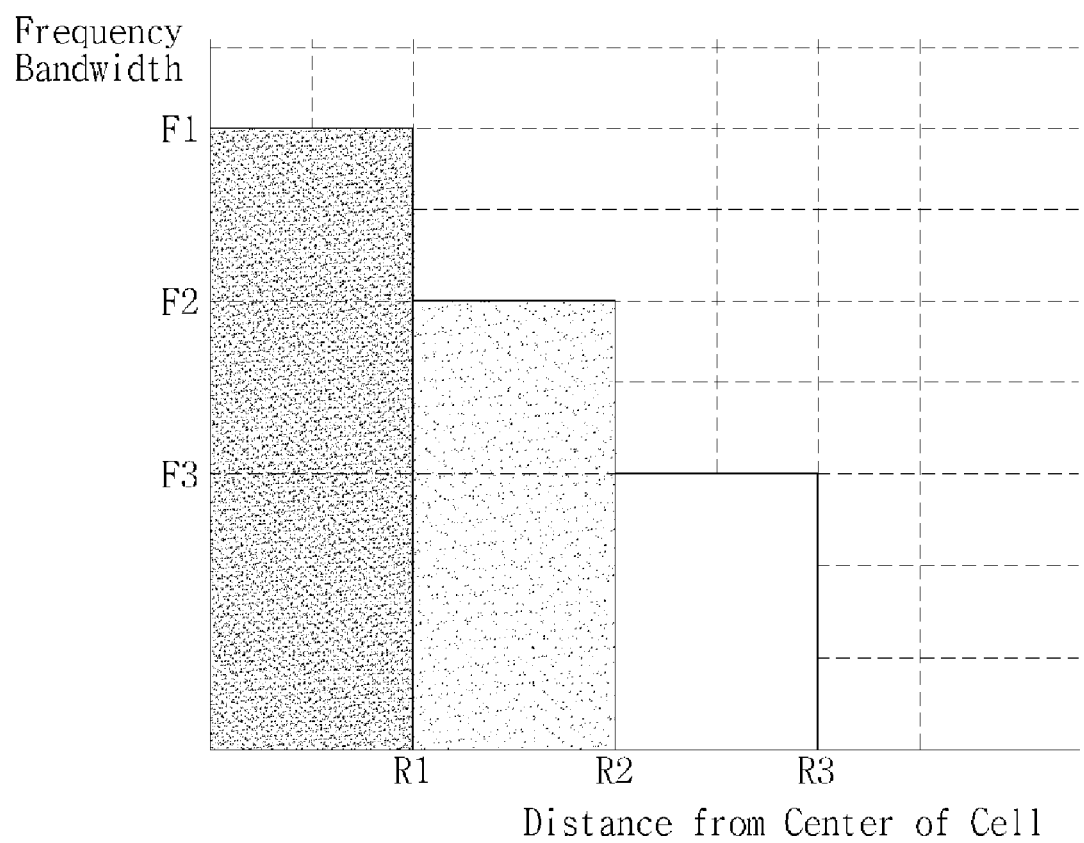
FIG. 1 is a graph illustrating frequency bandwidths differently allocated according to distance from the center of a cell according to an exemplary embodiment of the present invention.

FIG. 1 is a graph illustrating frequency bandwidths differently allocated according to distance from the center of a cell according to an exemplary embodiment of the present invention.

A detailed description of interference between cells will be given and a method of controlling the interference between cells will be described. A packet scheduler for non-real time data transfer employs proportional fairness (PF) algorithm. A downlink PF algorithm provides a service only to one user at each time, while an uplink PF algorithm simultaneously provides services to multiple users at a particular time. However, a serious system interference occurs if services are provided to all users requesting the services. Hence, the number of users needs to be efficiently controlled.

For an efficient control of the number of users, the rise over thermal (RoT) is used for each cell. The RoT indicates the ratio of interference to thermal noise and is used as a measure of how much interference is allowed for uncontrolled thermal noise. That is, services are provided to users on a priority basis until the number of users does not exceed a RoT threshold which is defined in a system. However, a conventional PF algorithm may only provide services to a plurality of users which are at the edge of a cell.

According to an exemplary embodiment of the present invention, the PF algorithm is differently applied to a central area of each cell and an edge of each cell. Furthermore, different frequency bandwidths are used according to distance from the center of a cell.

Referring to FIG. 1, a high frequency bandwidth F1 is allocated to a segment close to the center of a cell, an intermediate frequency bandwidth F2 is allocated to a segment in the middle, and a low frequency bandwidth F3 is allocated to a segment distant from the center of the cell.

Figure 2:
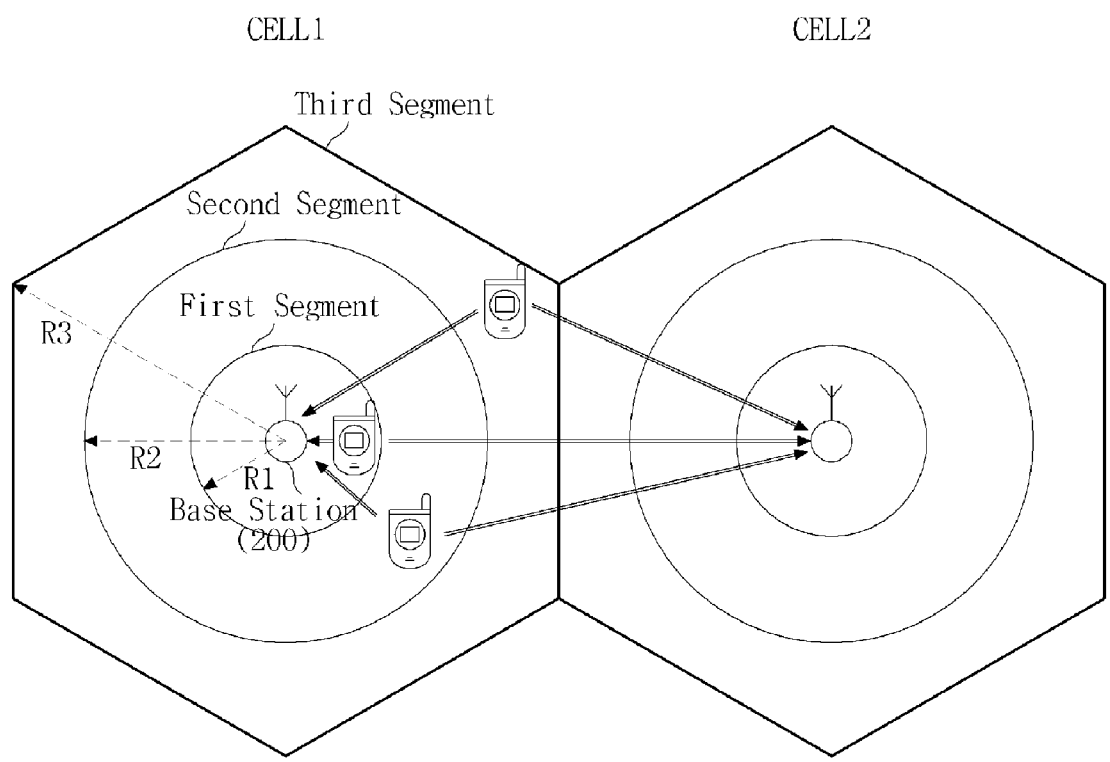
FIG. 2 illustrates segments divided by the distance from the center of a cell.

FIG. 2 illustrates segments divided by the distance from the center of a cell.

In a mobile communication system, users located close to a base station in a cell may receive a good quality of service with a relatively low transmission power, while users located on the edge of the cell may receive the same quality of service with a higher transmission power. The higher transmission power may cause higher interference with neighboring cells, resulting in degraded performance of the entire system. Accordingly, the system performance and the interference between cells may be controlled by allocating fewer resources to the users at the edge of the cell, if possible.

A cell is basically designed such that more users are located at the center of the cell with respect to a base station. Hence, more resources need to be allocated to the center of the cell. As described above, an uplink PF scheduler employs the RoT parameter to limit the number of users who are simultaneously being served. According to an exemplary embodiment of the present invention, the number of users is limited by dividing a cell into segments according to the distance from the center of the cell and allocating RoT to each segment in a predetermined proportion.

The division method may be determined depending on characteristic of the cell. For example, a downtown area may be designed such that its central segment is wide in area and the number of segments is large. Accordingly, RoT is considered as a system resource and is allocated according to the frequency proportion and width which are allocated to each segment.

Referring to FIG. 2, each cell is divided into three segments 210, 220 and 230 according to distance from a base station 200 to each terminal.

Since the terminals are located within the coverage area of cell1, each arrow towards the cell1 indicates a signal and each arrow towards the cell2 indicates interference. It can be seen that a shorter length of arrow indicates a higher intensity of signal or interference since the intensity of signal or interference depends on the distance.

Since a system uses a single channel, the same frequency is used in the segments 210, 220 and 230. As described above, a terminal at the edge of the cell makes a relatively greater interference with a neighboring cell compared to a terminal at the center of the cell. In this case, in the event only a PF algorithm is used to make a non-real time uplink data transfer, many users at the edge of the cell may receive services under a certain situation, which may cause a severe interference between cells. According to an exemplary embodiment of the present invention, to address this problem, RoT is considered as a system resource and is differently allocated to each segment 210, 220 and 230 by distributing RoT to the segments in a predetermined proportion.

In a cell planning phase, a cell may be divided into segments depending on distance from a base station. The cell is divided into three segments 210, 220 and 230 in FIG. 2, but may be divided into more or less segments. The cell may also be differently divided depending on whether or not the cell is in a downtown area. Since the present invention is intended to reduce interference between cells by controlling users at the edge of a cell, the cell was divided into segments according to user density at the center and edge of the cell.

In a downtown area, there may be a number of users and the user density may be generally uniform in a cell. In this case, since there also are many users at the edge of the cell, a relatively wide edge of the cell needs to be controlled. Accordingly, in the downtown area, the central area of the cell is set to be as small as possible. On the other hand, in an uptown area, since relatively many users are at the center of a cell and a few are at the edge of the cell, the number of users causing interference between cells is relatively smaller compared to the downtown area. Hence, the central area of the cell may be relatively wider in the uptown area. This is designed by considering the characteristic of a region in an initial cell planning phase.

Once a method of dividing a cell is determined, R1, R2 and R3 values in FIG. 2 are determined. A system resource, RoT, is proportionally distributed to each segment considering attenuation of radio wave according to distance. The radio wave is typically attenuated by the distance raised to the a-th power, 'a' being an attenuation factor which is typically equal to about 3 to 4 from a theoretical research.

Accordingly, in FIG. 2, the intensity of radio wave transmitted from a terminal at a distance of R1 to a base station is $(R2/R1)^a$ times stronger than that transmitted from a different terminal at a distance of R2 to the base station. Assuming that reference points are R1, R2 and R3, RoT allocated to each segment is calculated from the following Equation 1:

$$\begin{aligned}RoT &= \sum_{i=1}^{n} RoT_i \qquad \text{[Equation 1]}\\ &= RoT_1 + RoT_2 + RoT_3 + \Lambda + RoT_n \\ &= RoT_1 + \left(\frac{r_1}{s_2 r_2}\right)^a \cdot RoT_1 + \left(\frac{r_1}{s_3 r_3}\right)^a \cdot \\ &\quad RoT_1 + \Lambda + \left(\frac{r_1}{s_n r_n}\right)^a \cdot RoT_1\end{aligned}$$

-continued $$= RoT_1 \cdot \sum_{i=1}^{n} \left(\frac{r_1}{s_i r_i}\right)^a$$

Equation 1 is a generalized expression for a case where a cell is divided into n segments.

If RoT is only allocated according to distance, a=1. If RoT is allocated with respect to area, a=2. If attenuation of radio wave is considered, a=3 or 4.

In this manner, since the allocation of RoT decreases from the center of a cell to the edge of the cell, the number of users served is limited at the edge of the cell, resulting in reducing interference between cells. Accordingly, a more RoT may be allocated to the users at the center of the cell. Hence, it is possible to overcome drawback of conventional PF scheduling.

In an actual environment, shadowing effect of buildings also needs to be considered. The shadowing effect is determined by a shadowing factor. The shadowing effect is one of factors to degrade the quality of service. Accordingly, RoT is less allocated to a shaded region.

According to an exemplary embodiment of the present invention, a shadowing factor $s_i$ is used in an equation for RoT allocation, where $s_i$ indicates an average shadowing level according to the distance.

A cell where there are a number of users and the user density is uniform may be divided into a more number of segments. On the contrary, a cell where there are a few users and the user density is not uniform may be divided into a fewer number of segments or may not be divided.

A frequency bandwidth allocated to each segment is calculated using RoT proportion of each segment from Equation 1. Assuming that RoT is a system resource, Equation 1 is an expression for RoT allocation according to user density, distance from the center of a cell, etc. Although RoT is less restrictive, if frequency bandwidth is not sufficient, it may not be possible to provide services to users.

As described above with reference to FIG. 1, in the mobile communication system, available frequency bandwidth decreases from the center of each cell to the edge of each cell. The frequency bandwidth allocated to each section is also derived from Equation 1 and is expressed in Equation 2. That is, this is allocated similarly to the RoT allocation.

$$F2 = \left(\frac{r_1}{s_i r_i}\right)^a \cdot F1 \qquad \text{[Equation 2]}$$

If each cell is divided and the frequency bandwidth is divided in this manner, a different frequency bandwidth is allocated to the outermost edge of each cell since each cell has a different density or radius. In the present invention, the control of interference between cells is limited to the outermost edge of a cell and interference between cells which occurs in inner segments is assumed to be negligible. In this case, as shown in FIG. 3, a part of a frequency bandwidth overlaps in two different cells and another part of the frequency bandwidth is only used in one of the two cells.

Figure 3:
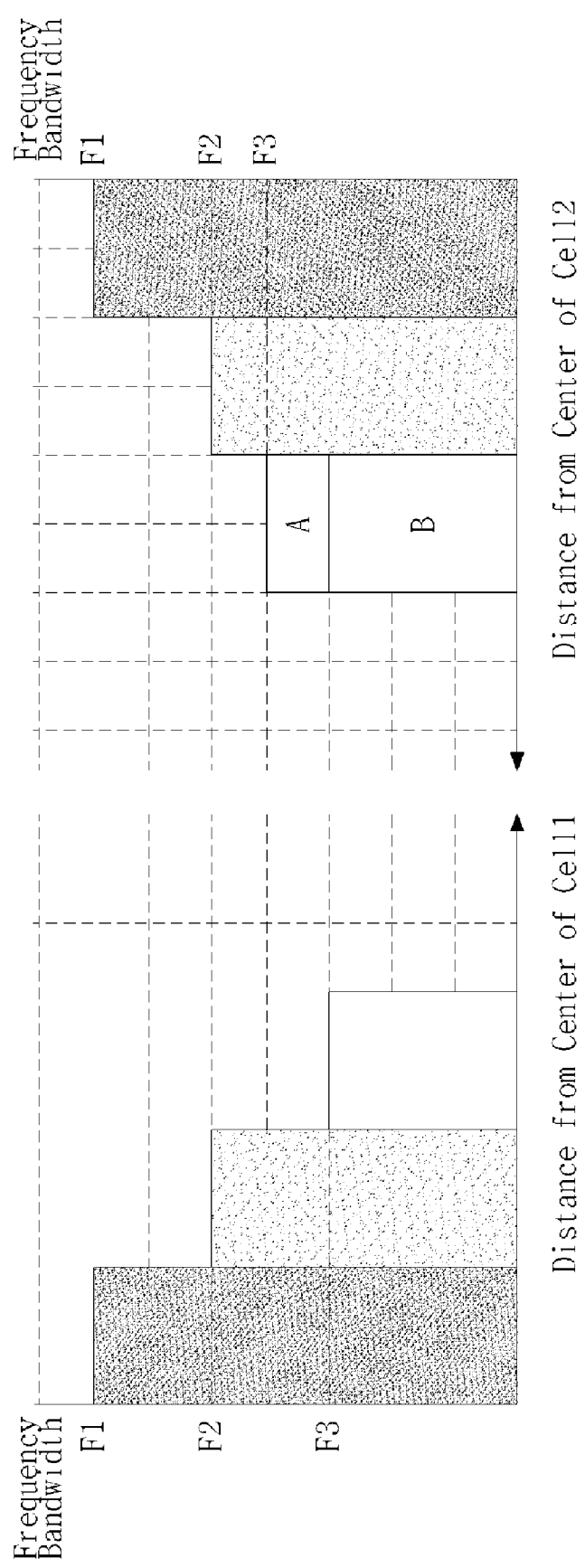
FIG. 3 illustrates an overlapped part of a frequency bandwidth used in two different cells and a non-overlapped part of the frequency bandwidth used only in one of the two cells.

FIG. 3 illustrates an overlapped part of a frequency bandwidth used in two different cells and a non-overlapped part of the frequency bandwidth used only in one of the two cells.

Interference between the cells will not occur in the non-overlapped part of the frequency bandwidth. A method of reducing interference between the cells is necessary in the overlapped part B of the frequency bandwidth. For the overlapped part B, a service is not provided in a certain cell under a certain condition.

Accordingly, the present invention proposes that a new information element (IE) should be added to load information, a message (X2 message) on an interface between base stations for inter-cell interference coordination (ICIC), which is defined in the current 3GPP standard. Examples of current information elements contained in the load information message for ICIC include overload indicator (OI), which notifies neighboring cells of experiencing interference with respect to its own specific resource block (RB)), high interference indicator (HII), which notifies neighboring cells of causing interference with respect to its own specific RB), and RNTP, which notifies neighboring cells of increasing downlink transmission power.

The present invention requires a new IE instead of the above-mentioned IEs. According to an exemplary embodiment of the present invention, instead of information about the entire RB, only RB for the outermost edge of each cell is necessary. Hence, information about RB to be used at the outermost edge of a cell is transformed into a bit string considering RB for frequency bandwidth allocated to the outermost edge of each cell. The bit string is then included in a load information message and transmitted to neighboring cells.

Figure 4:
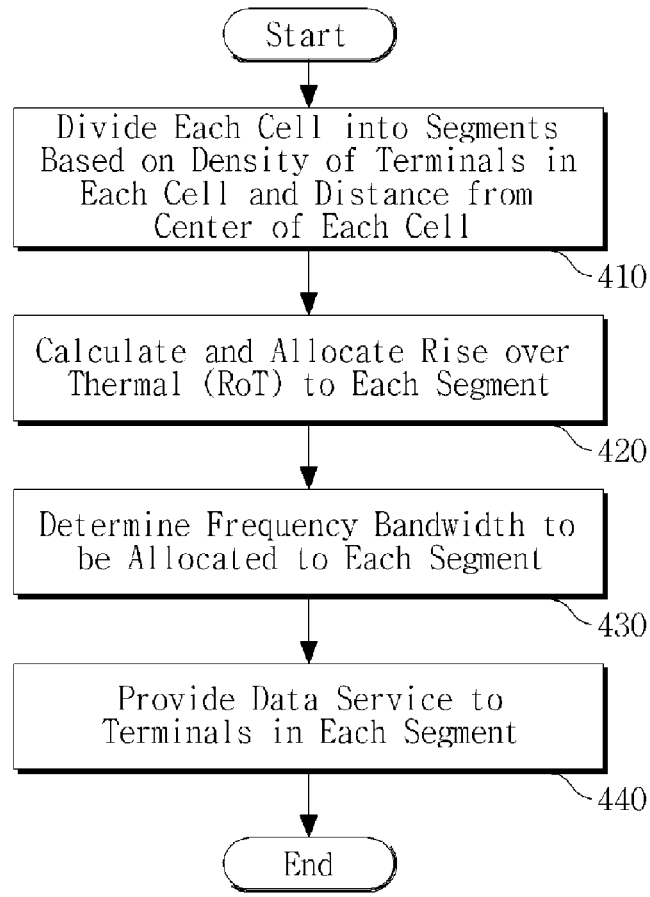
FIG. 4 is a flow chart of a method of controlling interference between cells in a mobile communication system according to an exemplary embodiment of the present invention.

FIG. 4 is a flow chart of a method of controlling interference between cells in a mobile communication system according to an exemplary embodiment of the present invention.

At S410, each cell is divided into segments based on density of terminals within each cell and distance from the center of each cell.

A cell where the number of terminals is large and the terminal density is uniform may be divided into a more number of segments. Further, the cell may be divided into segments considering whether or not a region covered by each cell belongs to a downtown area, how the terminals are distributed in the region, and where radio wave is distorted.

At S420, RoT is calculated and allocated with respect to each segment considering the distance from the center of each cell, attenuation of radio wave according to the distance, and a shadowing factor. The shadowing factor indicates an average shadowing level according to the distance from the center of each cell. RoT is inversely proportional to the shadowing factor. As described above with reference to Equations 1 and 2, RoT is attenuated by $(1/s_i r_i)^a$.

At S430, a frequency bandwidth is determined to be allocated to each segment. At this time, a frequency bandwidth decreases as a segment becomes more distant from the center of the cell and is inversely proportional to the shadowing factor which indicates an average shadowing level according to the distance. This may be calculated from Equation 2.

At S440, a data service is provided to each terminal in each segment divided according to the allocated interference ratio.

Figure 5:
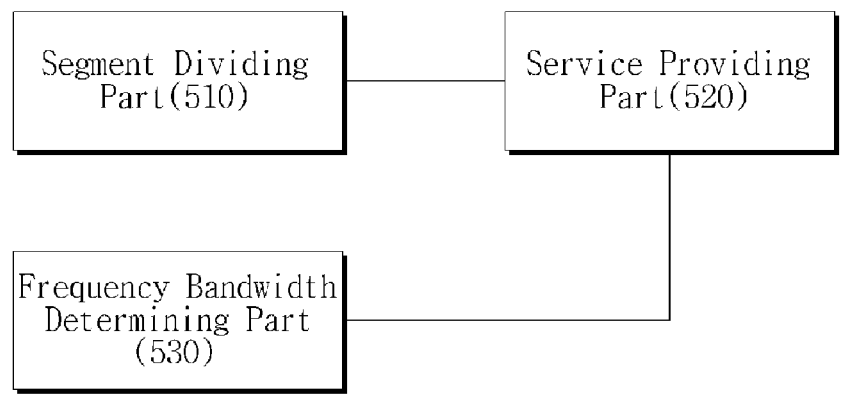
FIG. 5 is a block diagram of an apparatus for controlling interference between cells in a mobile communication system according to an exemplary embodiment of the present invention.

FIG. 5 is a block diagram of an apparatus for controlling interference between cells in a mobile communication system according to an exemplary embodiment of the present invention.

The apparatus includes a segment dividing part 510, a service providing part 520, and a frequency bandwidth determining part 530.

The segment dividing part 510 divides each cell into a plurality of segments based on the density of terminals within each cell and the distance from the center of each cell. The segment dividing part 510 increases the number of segments as there are more terminals and the terminal density is more uniform. Further, the segment dividing part 510 may divide each cell considering whether or not a region covered by each cell belongs to a downtown area, how the terminals are distributed in the region, and where radio wave is distorted.

The service providing part 520 calculates and allocates RoT with respect to each segment considering the distance from the center of a cell, attenuation of radio wave according to the distance, and a shadowing factor, and provides data services to terminals within each segment. The shadowing factor indicates an average shadowing level according to the distance from the center of the cell. RoT is inversely proportional to the shadowing factor. This may be obtained from Equation 1.

The frequency bandwidth determining part 530 determines a frequency bandwidth to be allocated to each segment. At this time, the frequency bandwidth decreases as a segment becomes more distant from the center of the cell and is inversely proportional to the shadowing factor which indicates an average shadowing level according to the distance.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

As apparent from the above description, rise over thermal (RoT) for limiting the number of users being served is considered as a system resource. RoT is appropriately distributed to each segment to limit the outermost edge of each cell where interference between cells is severe. Furthermore, an uplink non-real time data service is not provided to the outermost edge of the cell under a certain condition. Accordingly, it is possible to improve system throughput.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling interference between cells in a mobile communication system including a plurality of cells, comprising:
    dividing each cell into at least one segment based on density of terminals within each cell and distance from the center of each cell;
    allocating rise over thermal (RoT) with respect to each segment based on the distance from the center of each cell, an attenuation ratio according to the distance, and a shadowing factor; and
    providing data services to the terminals within each segment according to the allocated RoT,
    wherein the shadowing factor indicates an average shadowing level, and the RoT is inversely proportional to the shadowing factor.

2. The method of claim 1, wherein the RoT is attenuated by the shadowing factor times the distance raised to an a-th power.

3. The method of claim 2, wherein the expression 'a' of the 'a-th power' is an attenuation factor of a radio wave.

4. The method of claim 1, wherein dividing comprises increasing the number of segments as the number of the terminals is larger.

5. The method of claim 1, wherein dividing comprises dividing the cell considering whether or not a region covered by each cell belongs to a downtown area, how the terminals are distributed in the region, and where a radio wave is distorted.

6. The method of claim 1, further comprising, after allocating, determining a frequency bandwidth to be allocated to each segment.

7. The method of claim 6, wherein the frequency bandwidth decreases as a segment becomes distant from the center of the cell.

8. The method of claim 6, wherein the frequency bandwidth is inversely proportional to the shadowing factor.

9. The method of claim 6, wherein a service is not provided in a certain cell under a certain condition with respect to a part of a frequency bandwidth overlapped with an exclusively available frequency bandwidth among frequency bandwidths allocated to the outermost edge of each cell.

10. An apparatus for controlling interference between cells in a mobile communication system including a plurality of cells, comprising:
    a segment dividing part to divide each cell into at least one segment based on density of terminals within each cell and distance from the center of each cell; and
    a service providing part to allocate rise over thermal (RoT) with respect to each segment based on the distance from the center of each cell, an attenuation ratio according to the distance, and a shadowing factor and to provide data services to terminals within each segment according to the allocated RoT,
    wherein the shadowing factor indicates an average shadowing level, and the RoT is inversely proportional to the shadowing factor.

11. The apparatus of claim 10, wherein the RoT is attenuated by the shadowing factor times the distance raised to an a-th power.

12. The apparatus of claim 10, wherein the segment dividing part increases the number of segments as the number of the terminals is larger.

13. The apparatus of claim 10, wherein the segment dividing part divides the cell considering whether or not a region covered by each cell belongs to a downtown area, how the terminals are distributed in the region, and where a radio wave is distorted.

14. The apparatus of claim 10, further comprising a frequency bandwidth determining part which determines a frequency bandwidth to be allocated to each segment.

15. The apparatus of claim 14, wherein the frequency bandwidth determining part decrease the frequency bandwidth as a segment becomes distant from the center of the cell.

16. The apparatus of claim 15, wherein the frequency bandwidth is inversely proportional to the shadowing factor.

* * * * *